(12) United States Patent
Ziavras et al.

(10) Patent No.: US 8,870,121 B2
(45) Date of Patent: Oct. 28, 2014

(54) ACTUATING DEVICE

(75) Inventors: John Ziavras, Hermosa Beach, CA (US); Richard L. Walton, El Segundo, CA (US); Mark A. Cook, Hermosa Beach, CA (US)

(73) Assignee: The Boeing Company, Chicago, IL (US)

( * ) Notice: Subject to any disclaimer, the term of this patent is extended or adjusted under 35 U.S.C. 154(b) by 2090 days.

(21) Appl. No.: 11/952,915

(22) Filed: Dec. 7, 2007

(65) Prior Publication Data

US 2009/0146009 A1     Jun. 11, 2009

(51) Int. Cl.
*F16D 43/25*     (2006.01)
*B64C 13/28*     (2006.01)

(52) U.S. Cl.
CPC ...................................... *B64C 13/28* (2013.01)
USPC ...................... 244/129.5; 192/12 B (58) Field of Classification Search
CPC .................................................... B64C 1/1461
USPC ........ 192/48.6, 12 B; 475/281, 308; 254/110, 254/107; 244/129.5, 129.4, 129.1; 49/140
See application file for complete search history.

(56) References Cited

U.S. PATENT DOCUMENTS

| | | | | |
|---|---|---|---|---|
| 2,621,544 A | * | 12/1952 | Rossmann | 475/4 |
| 4,650,007 A | * | 3/1987 | Fujita et al. | 173/178 |
| 6,026,522 A | * | 2/2000 | Last | 4/502 |

* cited by examiner

*Primary Examiner* — Brian M O'Hara
(74) *Attorney, Agent, or Firm* — Canady & Lortz LLP; Bradley K. Lortz (57) ABSTRACT

An actuator is configured for transmitting a force or torque to a load. In one example configuration, the actuator includes an input device configured to apply an output force. A backstopping clutch is configured to transmit torque only in the input direction and to prevent back-driving of the input device. An overrunning clutch is configured to include a driven member moved in response to the transmitted torque in the input direction. The load may be moved in response to the driven member, or the load may be moved by a force applied directly to the load.

14 Claims, 6 Drawing Sheets

ACTUATING DEVICE

GOVERNMENT RIGHTS

This invention was made with Government support under contract number N00019-04-C-3146 awarded by the United States Navy. The government has certain rights in this invention.

FIELD

This disclosure relates to actuating devices used for transmitting force to a load, and in one example application, to an actuating device configured for withdrawing a door into an aircraft against mechanical resistance.

BACKGROUND

Actuating devices configured to receive a mechanical input and provide a mechanical output are used in many applications. Accordingly, a number of such devices are known, each having structural characteristics appropriate to an intended application.

Unfortunately, while the number of known actuating devices is considerable, new applications with increasingly complex design requirements are not satisfied by existing actuating devices.

SUMMARY

An actuator is configured for transmitting a force to a load. In one example configuration, the actuator includes an input device configured to apply torque to an output member that in turn applies a force to a load. A backstopping clutch is configured to transmit the torque only when in one direction and to prevent back-driving of the input device in the opposite direction. An overrunning clutch is configured to include a driven member moved by a driving member in response to the transmitted torque in the input direction. The overdriving clutch allows the load to be moved by at least two alternative structural configurations and/or methods. In one alternative, the load may be moved in response to torque transmitted from the driven member. In a second alternative, the load may be moved by a force or torque applied directly to the load.

This Summary is provided to introduce a selection of concepts in a simplified form that are further described below in the Detailed Description. This Summary is not intended to identify key features or essential features of the claimed subject matter, nor is it intended for use as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

The present disclosure relates to several different actuator configurations. The actuators described herein are intended to illustrate general principles having wide applicability. In one example application, an actuator is adapted for transmitting a force used to move a load. Such an actuator may include a manually operated input device, and be configured to apply torque to a load, such as the resistance encountered when opening an aircraft door in flight. The manually operated input device may be in the form of a lever, a motor or other device. A backstopping clutch is configured to transmit torque in the driving direction, while preventing back-driving of the input device. Back-driving of the input device is a condition wherein the input device moves in response to conditions "downstream," e.g. a movement of the load. In some configurations, the actuator may include gears, such as planetary gears, to provide mechanical advantage. An overrunning clutch is configured "in series" in the drive-train. In such a configuration, the clutch allows the input device to transmit torque in the driving direction, and alternatively allows direct actuation of the output (e.g. direct movement of the load) in the same direction. The clutch thereby allows a force applied directly to the load to move the load without having to overcome resistance created by the gears or other components. Accordingly, a two-clutch design prevents back-drive when sustained loads are encountered, and also allows the user to overdrive by direct movement of the load when resistance to moving the load is not present or is reduced. Due to the mechanical advantage provided in applications configured to include gears, in many applications a single worker may move a considerable load unassisted.

The example actuators described below are intended for general application. However, in an example application, an actuator based on some or all of the concepts introduced below, is adapted for opening an aircraft door. Such a door is typically opened outwardly and folded in the open position along the outside of the fuselage of the aircraft. However, in an in-flight emergency, the door must be opened inwardly, so that it is not pushed into the air stream. The example actuators may be configured to move the door inwardly, and are advantageously independent of existing aircraft electrical, hydraulic and pneumatic systems, and require minimal modification to the door. Additionally, the example actuators disclosed may be configured not to interfere with the normal operation of the aircraft door. The example actuator may be configured to engage the load (e.g. the door) automatically upon release of a manually operated handle, lever or other input device, allowing a user to immediately begin use. A geared design provides the mechanical advantage necessary for a single crew member to operate the actuator to retract the door from its seal against large dynamic pressure loads that may be present in flight. The example actuators may allow the user to act simultaneously and/or intermittently on the door in two modes. In a first mode, use of the geared actuator provides mechanical advantage when needed. In a second mode, the actuator allows the user to pull directly on the door when that is made possible by the absence of large resistance loads during all or part of the door-opening process. Following opening of the door, the actuator may be easily reset to allow conventional operation of the door. Accordingly, while the actuators described herein are intended for general purposes, each actuator could be configured for operation in a specific application, such as opening an aircraft door in an emergency. In such an example, the configuration may include an appropriate output link attached to the aircraft door.

Figure 1:
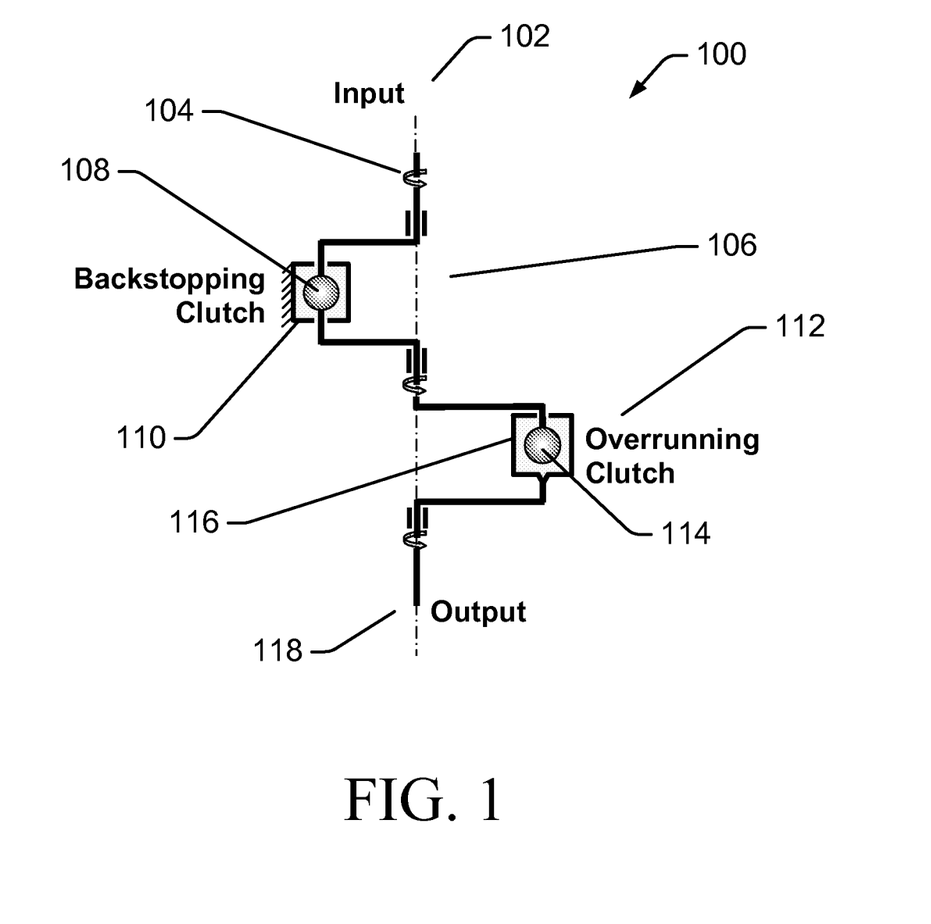
FIG. 1 is a diagrammatic view of an example actuator.

FIG. 1 illustrates one example configuration of an actuating device 100. The actuating device 100 includes an input 102 configured to receive a torque having direction 104. The torque may be applied manually by a lever arm, or alternatively by a motor, spring or other device.

The input torque is applied through a backstopping clutch 106 that allows rotation in the input direction 104 (seen in the example of FIG. 1 as counter-clockwise when looking from the input-to-output direction). However, the backstopping clutch prevents rotation in the opposite direction. The backstopping clutch is drawn symbolically as a driven member 108 (illustrated as a ball) which is allowed to move in the counter-clockwise direction, but is prevented from moving in the clockwise direction by a backstop 110 that is secured (i.e. grounded) in a fixed position. Again, the illustration is symbolic, and the reader should realize that the driven member 108 may make many revolutions in the allowed direction without interference from the backstop 110, which illustrates only that the driven member cannot move in the non-allowed direction. Thus, operation of the backstopping clutch 106 allows torque to be transmitted in one direction, but prevents transmission in the other direction. Accordingly, the input source or device cannot be "back-driven" (i.e. input cannot be driven in reverse) by events downstream (i.e. closer to the output 118) from the backstopping clutch 106.

Output torque from the backstopping clutch 106 is input to the overrunning clutch 112. The overrunning clutch 112 in the example of FIG. 1 transmits torque in counter-clockwise direction. In the symbolic drawing, a driving member 114 (illustrated as a ball) drives a driven member 116 (illustrated as a non-secured, i.e. non-grounded, backstop). Thus, movement of the driving member 114 in the counter-clockwise direction moves the driven member 116 in the counter-clockwise direction.

The overrunning clutch 112 allows the system to be overrun. In particular, if a force is applied to a load (not shown) driven by the output 118, the driven member 116 will turn in the counter-clockwise direction independently of the driving member 114. (A load is not shown in FIG. 1 for clarity, but in the example of FIG. 2, the load is seen as an output link 216 connected to a door 222.) Accordingly, in the event of a force applied directly to the load, movement of the driven member 116 is not slowed, restrained or impeded by the driving member 114. Stated somewhat differently, if a force is applied directly to the load, the driven member 116 will move without back-driving the drive member 114. Thus, the output may be moved by operation of the driven member 116 or by a force applied directly to the output, or by a combination of the two.

Figure 2:
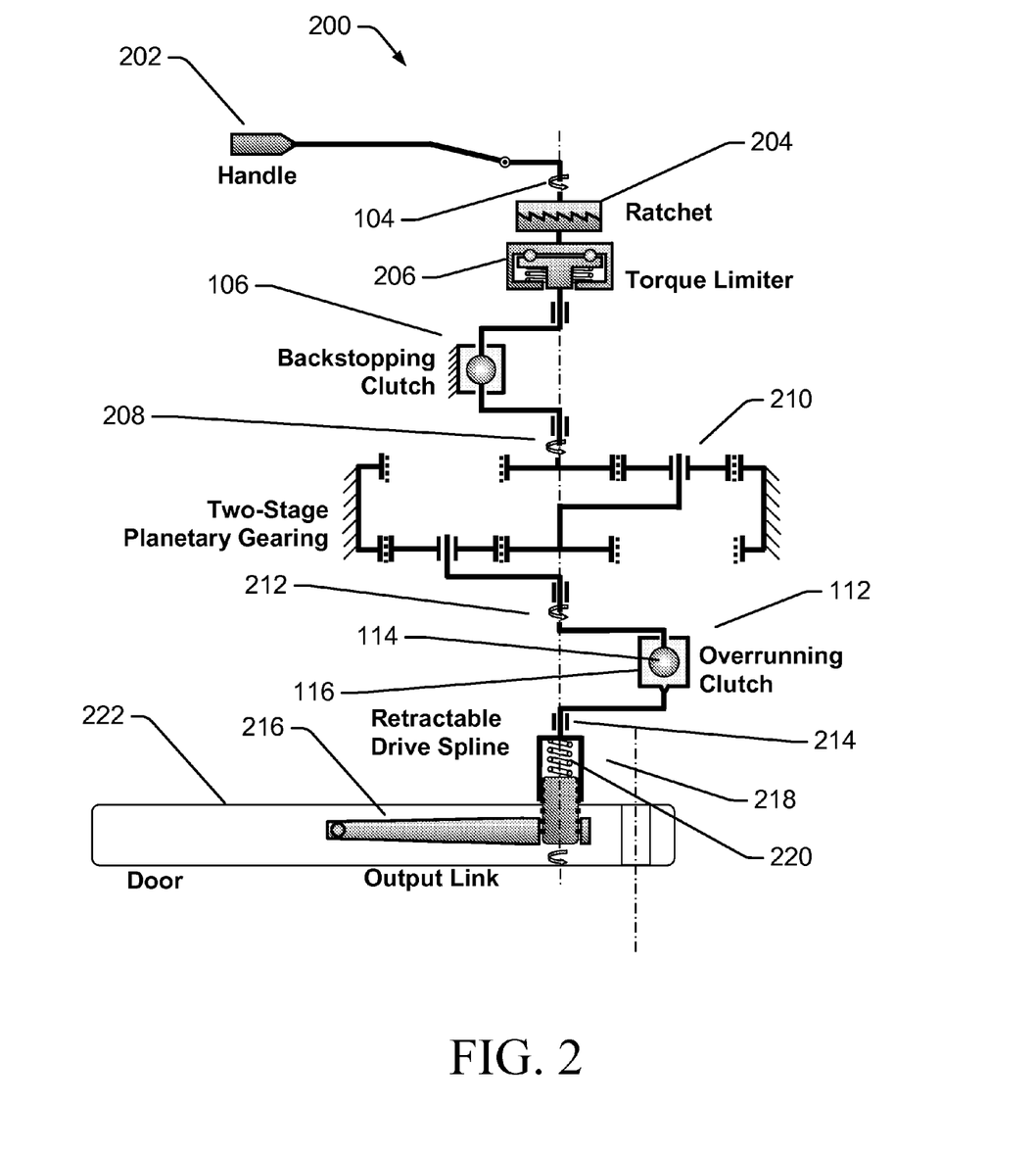
FIG. 2 is a diagrammatic view of a further example actuator, showing how it may be used to move a door.

FIG. 2 illustrates a second example configuration of an actuating device 200, wherein an output link 216 drives a load, such as a door 222 or other object. A handle 202 is configured to apply torque in an input direction 104. The handle/lever 202 is illustrated in FIG. 2 in a stroke-begin position. Movement of the handle/lever 202 from the stroke-begin position to the stroke-end position transmits rotary force through the ratchet device 204. The ratchet device 204 allows return movement of the lever 202 from the stroke-end position to the stroke-begin position without driving downstream components. Accordingly, a user may apply input manually, by repeated strokes (e.g. a reciprocating input) of the input lever 202.

In the example of FIG. 2, output from the ratchet 204 is input to a torque limiter 206. The torque limiter may be configured to transmit torque applied at less than a threshold value, and to reject and/or not transmit torque applied at greater than a threshold value. In one example, the torque limiter allows the input lever 202 to move from the stroke-begin position to the stroke-end position without resistance if torque greater than the threshold value is applied. In such an event, no torque in excess of the threshold value is applied by the input lever 202. By limiting the torque, components may be efficiently sized and/or specified (such as by rating), and are thereby protected from forces too great for their construction. Additionally, the rate at which the load is moved may be limited by limiting torque.

The backstopping clutch 106 of FIG. 2 is similar to that seen in FIG. 1. The backstopping clutch 106 allows torque to be transmitted in one direction, and prevents rotation in the opposite direction. Accordingly, the input cannot be "back-driven" by events downstream from the backstopping clutch 106.

Output 208 from the backstopping clutch 106 is input to gears 210. In the example of FIG. 2, the gears 210 are a two-stage planetary gear system. However, any alternative transmission system could be used, including sprocket/chain, belt/pulley systems or other gearing, as indicated by the particular application. However, planetary gears are compact and efficient, and provide the necessary torque needed for many applications. In most applications, the planetary gears will provide a substantial increase in torque and decrease in a rate of angular rotation.

The output 212 of the gears 210 is input to an overrunning clutch 112 having a driving member 114 and a driven member 116. The operation of the overrunning clutch 112 is similar to the clutch of FIG. 1, and allows a load to be moved in a direct manner—without use of the actuating device 200 and without the driving member 114 retarding the movement of the driven member 116. Therefore, the overrunning clutch 112 allows direct movement of the load, and prevents direct movement of the load from applying torque to the gears 210.

An output 214 of the overrunning clutch 112 is input to a drive transfer device, which can be used to regulate whether or not the drive output from the overrunning clutch is applied to an output, such as output link 216. Thus, the actuator 200 can be coupled to, or decoupled from, the output or load by operation of the drive transfer device. In the example of FIG. 2, the drive transfer device is a retractable drive spline 218. In an extended position, the drive spline 218 is engaged to the load (e.g. output link 216, which in turn is attached to a door or other load to be moved). In a retracted position, the drive spline 218 is disengaged from the load. In the example of FIG. 2, the drive spline 218 is configured for movement from the retracted position to the extended position by relaxation of a spring 220 or similar device.

Figure 3:
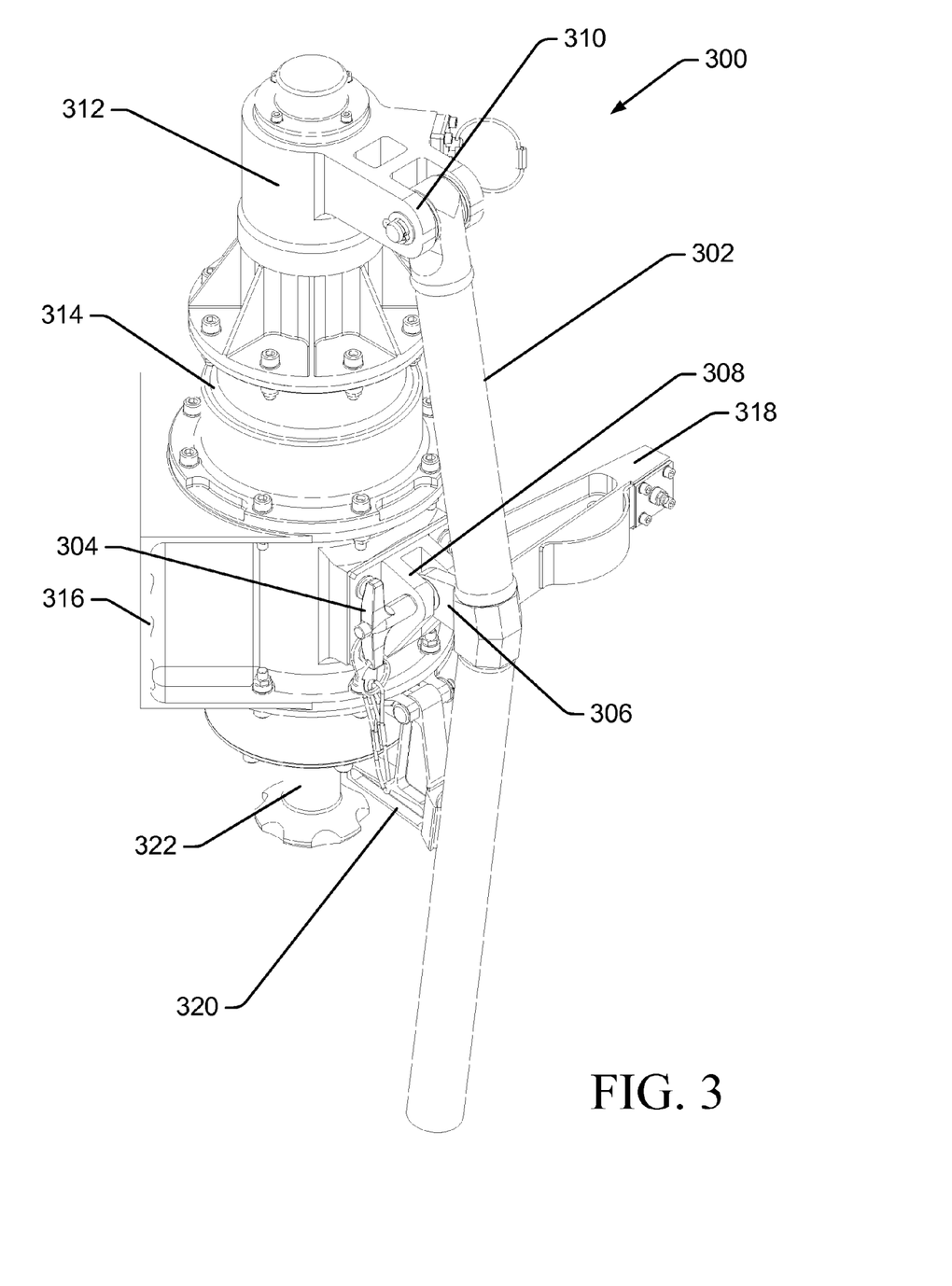
FIG. 3 is an example of an actuator, particularly showing a manual input lever or handle in a storage position and a drive component in a position disengaged from a load.

FIG. 3 illustrates an example configuration of an actuating device 300. A manually operated lever arm or handle 302 is configured for location either in a storage position or in an operable position. In the storage position, shown in FIG. 3, the handle 302 retains the bail 320, which in turn retains the drive member 322 in a disengaged condition. In the operable position, the handle 302 provides mechanical advantage when applying torque. In the example of FIG. 3, a pull-pin 304 secures a bracket 306 attached to the handle 302 to a bracket 308 attached to a main housing of the actuating device 300. In operation, removal of the pin 304 allows the handle 302 to rotate about a pivot 310 between the storage and operable positions.

A torque limiter assembly 312 is configured to apply torque, received from the manually operated lever, having less than a threshold value. Torque over the threshold value is not transmitted. For example, if the torque exceeds the threshold, the torque limiter assembly may allow the lever arm 302 to move with no resistance (thereby allowing the lever arm to transmit no energy). A gearbox assembly 314 is configured to increase the torque applied by the lever arm, and to reduce the angular velocity (rpm) of the input. The gearbox assembly 314 may include planetary gears or other gearing as indicated by the design requirements of the particular application.

A door interface 316 adapts the actuating device 300 to opening an aircraft door or to movement of another load, depending on the application to which the actuator 300 is put. Accordingly, the interface 316 may be configured as required by the particular installation. In an installation similar to that of FIG. 2, the door interface allows installation of the actuating unit 300 as required to position an output to withdraw the door against a load and into the aircraft cabin. In the application illustrated by FIG. 3, the output arm 318 (i.e. output of the actuator 300) is configured to withdraw the door into the aircraft cabin. The output arm may act on a parallel linkage or other hardware attached to the door.

Movement of the lever arm 302, from the storage position to the operable position, releases a bail 320, results in deployment of a plunger 322 from a retracted position into an extended position. Moving the plunger between the retracted position and extended positions reconfigures the actuator 300 from disabled to enabled modes, respectively. In one example, movement of the plunger 322 results in movement of the retractable drive spline 218 shown in FIG. 2. Thus, with the plunger 322 in the extended position, the drive spline 218 is engaged to the load. With the plunger 322 in the retracted position, the drive spline 218 is disengaged from the load.

Figure 4:
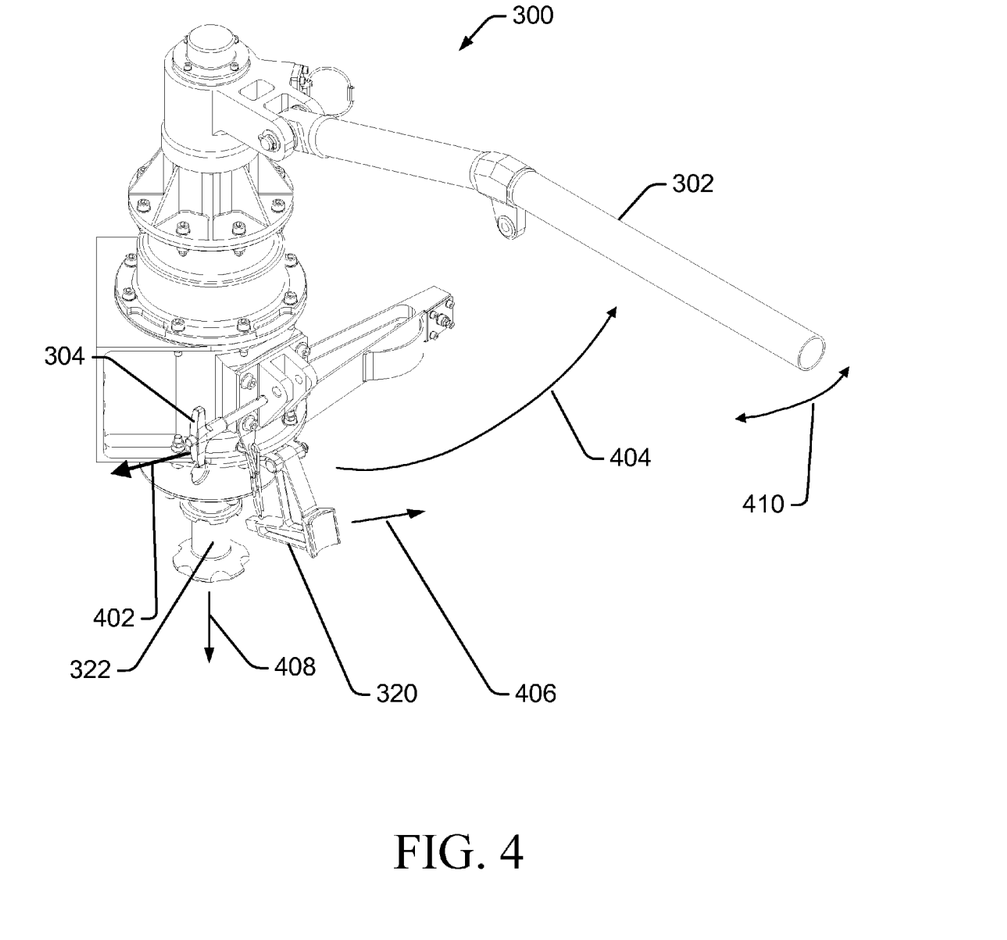
FIG. 4 shows another view of the example actuator of FIG. 3, particularly showing the manual input lever in an operational position and the drive components deployed to engage the load.

FIG. 4 illustrates additional aspects of the actuator 300. Removal of the locking pin 304 in the direction 402 allows movement of the lever arm 302 in the direction 404 from the storage position (as seen in FIG. 3) to an operable position (as seen in FIG. 4). Movement of the lever arm 302 releases the bail 320 for movement in the direction 406. Movement of the bail 320 releases the plunger 322 to move in the direction 408, thereby engaging the retractable drive spline 218 (FIG. 2) or other drive device. A spring 220 (seen in FIG. 2) may be used to produce the motion in direction 408. After the actuator has moved from the disengaged position to the engaged position, the lever arm 302 may be manually moved between the stroke-begin position (on the left) and the stroke-end position (on the right) as indicated by arrow 410. Note that the relative locations of the stroke-begin and stroke-end positions are arbitrary, and could be reversed if desired.

Figure 5:
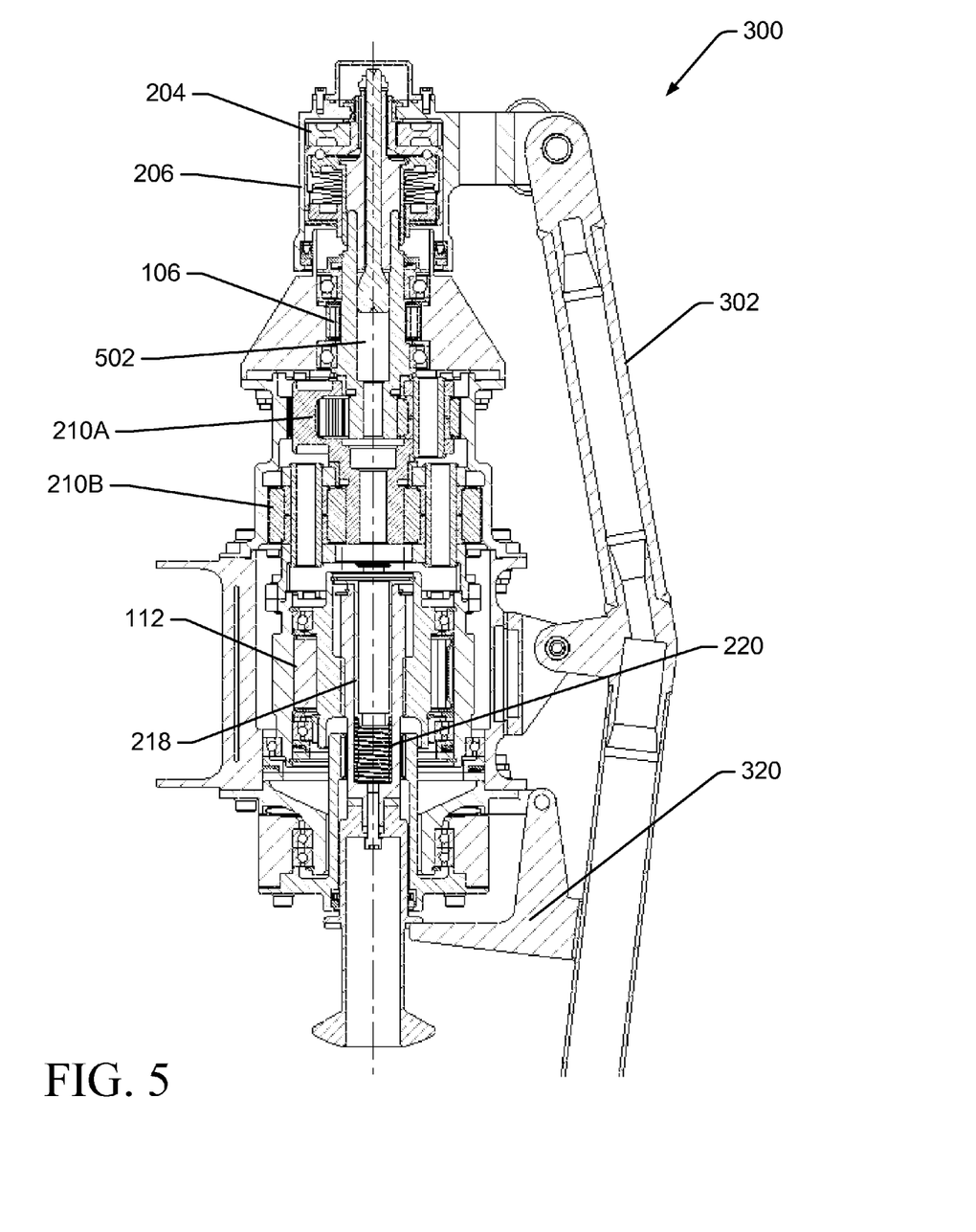
FIG. 5 shows an orthographic cross-sectional view of the example actuator of FIG. 3.

FIG. 5 is a cross section view illustrating additional aspects of the actuator 300 of FIG. 3. The ratchet assembly 204 allows torque to be applied in one direction, as the lever arm 302 is moved from the stroke-begin position to the stroke end position. The ratchet assembly 204 allows the lever arm 302 to be returned to the stroke-begin position without applying torque in the reverse direction. The torque limiting assembly 206 prevents application of excess torque to the gearing system. The backstopping clutch 106 allows transmission of input torque from the torque limiting assembly 206 via an input shaft, but prevents back-driving of the input, e.g. lever arm 302 or other input device. The two-stages 210A and 210B of the planetary gears 210 receive input torque from an input shaft 502. The inclusion of gears, and what type of gears, depends greatly on the application. The gears illustrated are intended only as an example. The output of the two-stage gearing drives the load through an overrunning clutch 112. The overrunning clutch 112 allows a load to which the actuator 300 is attached to be moved without operation of, and without being impeded by, the actuator 300. The retractable drive spline 218 is extended by the spring 220 when the bale 320 moves in response to movement of the lever arm 302. Operation of the actuator 300 moves the output link 216 (FIG. 2), which moves the load, such as an aircraft door.

Figures 6, 7:
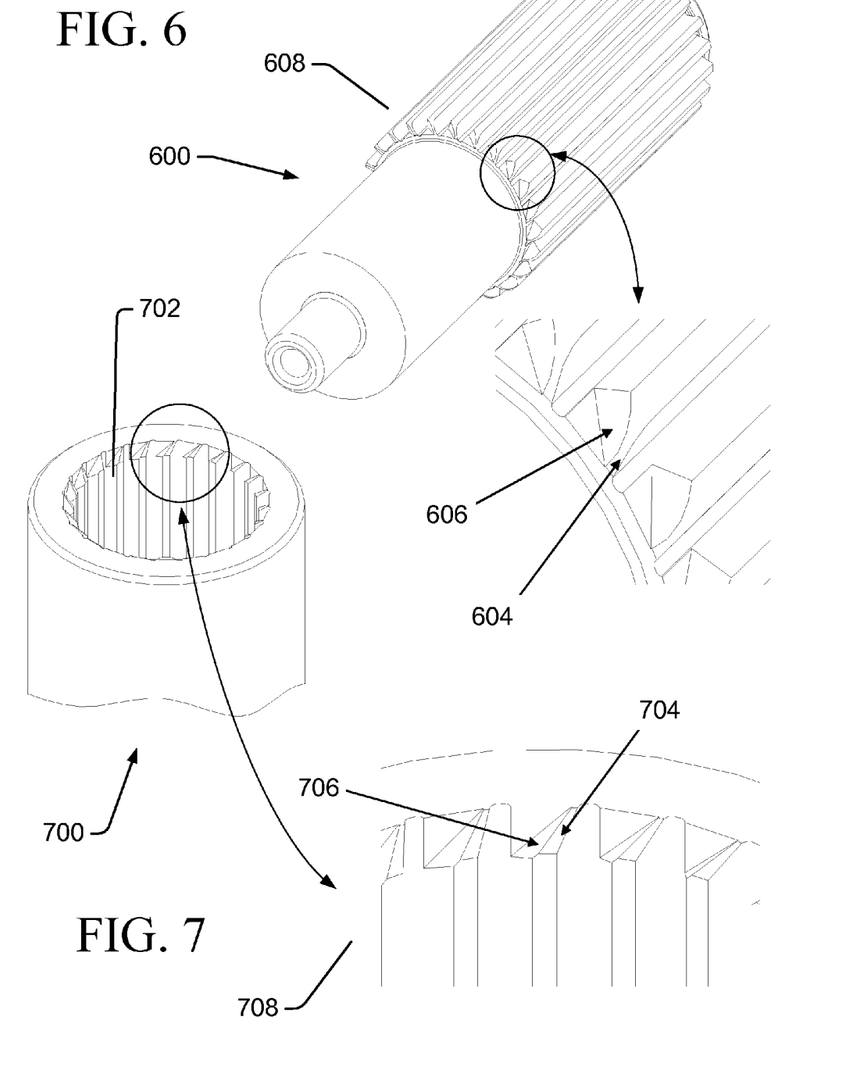
FIG. 6 is an example, shown in an isometric view, of an external driving spline.
FIG. 7 is an example, shown in an isometric view, of an internal driven spline, configured for operation with the spline of FIG. 6.

FIGS. 6 and 7 show isometric views of examples of an external driving spline 600 and an internal driven spline 700, respectively. Each figure includes an enlarged view of a portion of the teeth of the spline, particularly showing features of the teeth that promote engagement of the splines. The driving and driven splines 600, 700 are configured to engage and to disengage a drive-train (such as seen generally in FIGS. 1 and 2) from an output load (e.g. output link 216 of FIG. 2). The engagement and disengagement is facilitated by relative movement of the external 600 and internal 700 spline shafts. In the disengaged condition, the driving (external) spline shaft 600 is retracted from the driven (internal) spline shaft 700. In the disengaged condition, the teeth of the spline shafts 600, 700 are not engaged. Upon release of the handle 202/302 (FIGS. 2 and 3) and bail 320 (FIG. 3) a spring 220 (FIGS. 2 and 5) propels the driving shaft 600 axially into the driven shaft 700, thereby engaging the teeth of the splines 600, 700.

Depending on the relative rotation of the drive spline 600 and driven spline 700, there may be some degree of rotational misalignment of external and internal spline teeth. Such misalignment may prevent engagement of the splines 600, 700. In such a misalignment condition, the input shaft 600 may be required to rotate as much as one circular pitch at the spline pitch radius to correct misalignment and allow engagement of splines 600, 700. The example splines 600, 700 seen in FIGS. 6 and 7 address the misalignment issue by providing that the shape of ends of the teeth of both splines allow rapid engagement of the two splines by axial force of the spring 220 with minimal rotary input motion.

Referring to the example of FIG. 6, the teeth 602 of the external spline 600 include a rounded surface 604 and a tapered lead in surface 606 at an engagement end 608 of each tooth. (Note that the teeth 602 are oriented in an axial direction along the outer surface of the spline 600. Accordingly, the engagement end 608 of the teeth 602 is the end that first makes contact with teeth 702 of the driven spline 700.) The teeth 602 are also tapered axially from the engagement end 608.

FIG. 7 shows an example of a driven spline having teeth 702 that define a chamfered end surface 704 and a tapered lead-in surface 706 at their engagement end 708. The internal spline teeth 702 are tapered to compliment the external spline teeth 602.

In operation, the spring 220 (FIG. 5) propels the driving spline shaft 600 axially into the driven shaft 700. If the drive spline 600 and the driven spline 700 are misaligned, the rounded end 604 of the external drive spline 600 and the chamfered end surface 704 of the internal driven spline 700 will make contact. Contact between the rounded end 604 and the chamfered end surface 704 prevent initial contact by sharp edges of the splines. Subsequently, the tapered lead-in surface 606 of the external driving spline 600 and the tapered lead-in surface 706 of the driven spline 700 make contact. Contact of the tapered lead-in surfaces 606, 706 and an axial force provided by spring 220 or similar device results in a relative rotation of external and internal spline shafts 600, 700 to allow engagement. Upon engagement, substantially the entire axial length of the teeth 602 of the drive spline 600 are in contact with substantially the entire axial length of the teeth 702 of the driven spline 700. For example, as the external and internal spline shafts 600, 700 shown in FIGS. 6 and 7 are forced into engagement (such as by a spring 502), the external shaft 600 will rotate counterclockwise as viewed from the input end.

The spline engagement features of FIGS. 6 and 7 will allow quick axial engagement of splines 600, 700 with little or no actuator input motion (e.g. movement of the handle 202/302 of FIGS. 2 and 3). Thus, in the example of FIGS. 6 and 7, both the drive and driven splines include teeth having rounded and/or chamfered ends, and tapered lead-in surfaces 606, 706 defined on an engagement end to produce relative rotation of the splines to facilitate engagement of teeth of the splines. Large gear ratios incorporated into an actuator may create a need for greater input motion to ensure engagement.

Although aspects of this disclosure include language specifically describing structural and/or methodological features of preferred embodiments, it is to be understood that the appended claims are not limited to the specific features or acts described. For example, some specific aspects (e.g. "counterclockwise") have been used in the disclosure. However, these aspects are meant to be illustrative of larger concepts, and could be replaced by other aspects/features if desired. Uses of the actuators disclosed are not limited to aircraft door movement or any other purpose. The invention may be employed in applications wherein a device may occasionally or intermittently encounter large loads, or where it is desirable to actuate a load directly, in concert with or instead of, by use of an actuator. Accordingly, the specific features and acts are disclosed only as instructional examples, and are representative of more general concepts.

What is claimed is:

1. An actuator for transmitting a force to move a load, comprising:
   an input device configured to apply the force in a rotary direction;
   a backstopping clutch configured to transmit the force only when directed in the rotary direction and to prevent back-driving of the input device in an opposite direction from the rotary direction;
   an overrunning clutch having a driving member transmitting the force in the rotary direction through a driven member to the load, wherein a direct force, also in the rotary direction, may be applied to move the load directly, not slowed, restrained or impeded by the driving member;
   a ratchet to rotationally drive an input shaft through the backstopping clutch, and to allow movement of the input device from a stroke-end position to a stroke-begin position;
   a torque limiter to prevent the input device from applying more than a threshold amount of torque; and
   planetary gearing to receive an input force from the backstopping clutch and to provide an output force to the overrunning clutch.

2. The actuator of claim 1, wherein the input device is a manually operated lever arm having two positions, comprising:
   a storage position, wherein a fastener retains the lever arm in the storage position; and
   an operable position, oriented to provide mechanical advantage when applying the force;
   wherein movement of the lever arm from the storage to the operable position moves a drive component from a position wherein the actuator is not engaged to the load to a position wherein the actuator is engaged to the load.

3. The actuator of claim 1, wherein:
   the overrunning clutch allows the load to be moved if a drive and a driven spline are engaged; and
   both the drive and driven splines comprise teeth having surfaces defined on an engagement end to produce relative rotation of the splines to facilitate engagement of teeth of the splines.

4. The actuator of claim 1, additionally comprising:
   a drive component, having an engaged position that allows the actuator to drive the load and a disengaged position that disengages the actuator from the load; and
   an output link, configured for attachment to a door of an aircraft and driven by the drive component;
   wherein the input device is a manually operated lever arm having two positions, comprising:
      an operable position, configured to provide mechanical advantage in the rotary direction; and
      a storage position, configured to disengage the actuator from the load;
      wherein the drive component moves from the disengaged position to the engaged position in response to the input device moving from the storage position to the operable position.

5. The actuator of claim 1, further comprising:
   a drive component having an engaged position that conveys force from the driven member of the overrunning clutch to move the load and a disengaged position wherein the drive component is secured by the input device into the disengaged position.

6. The actuator of claim 5, wherein the drive component comprises:
   a drive spline, having teeth defining a rounded surface on an engagement end, and a driven spline, having teeth defining a chamfered end surface on an engagement end, wherein contact between the rounded surface and the chamfered surface precedes contact between a tapered surface on the drive spline and a tapered surface on the driven spline which promotes relative rotation of the splines to result in engagement of the splines.

7. An actuator for moving a door on an aircraft, comprising:
   an input device configured to apply force in a rotary direction;
   a backstopping clutch configured to transmit the force only when directed in the rotary direction and to prevent back-driving of the input device in an opposite direction from the rotary direction;
   an overrunning clutch having a driving member transmitting the force in the rotary direction through a driven member to the door, wherein a direct force, also in the rotary direction, may be applied to move the door directly, not slowed, restrained or impeded by the driving member;
   a drive component having an engaged position that conveys force from the driven member of the overrunning clutch to move the door and a disengaged position wherein the drive component is secured by the input device into the disengaged position;
   a ratchet to rotationally drive an input shaft through the backstopping clutch, and to allow movement of the input device from a stroke-end position to a stroke-begin position;
   a torque limiter to prevent the input device from applying more than a threshold amount of torque; and
   planetary gearing to receive an input force from the backstopping clutch and to provide an output force to the overrunning clutch.

8. The actuator of claim 7, wherein the input device is a manually operated lever arm having two positions, comprising:
   a storage position, wherein a fastener retains the lever arm in the storage position; and
   an operable position, oriented to provide mechanical advantage when applying the force.

9. The actuator of claim 8, wherein movement of the lever arm from the storage to the operable position moves a drive component from a position wherein the actuator is not engaged to the door to a position wherein the actuator is engaged to the door.

10. The actuator of claim 7, additionally comprising:
   a linkage, attached to the door, wherein the force applied by the drive component pivots the linkage and pulls the door into the aircraft.

11. The actuator of claim 7, wherein the drive component comprises:
   a drive spline, having teeth defining a rounded surface on an engagement end, and a driven spline, having teeth defining a chamfered end surface on an engagement end, wherein contact between the rounded surface and the chamfered surface precedes contact between a tapered surface on the drive spline and a tapered surface on the driven spline which promotes relative rotation of the splines to result in engagement of the splines.

12. A manually actuated door assembly for an aircraft, comprising:
   a door;
   an input device configured to apply torque in a first direction;
   a backstopping clutch configured to transmit the torque, while preventing back-driving of the input device in an opposite direction from the first direction;
   an overrunning clutch having a driving member transmitting the input torque through a driven member to the door, wherein a direct force, also in the first direction, may be applied to move the door directly, not slowed, restrained or impeded by the driving member;
   a drive component having an engaged position that allows the driven member of the overrunning clutch to apply force to the door and a disengaged position wherein the drive component is secured in the disengaged position by the input device;
   a ratchet to rotationally drive an input shaft through the backstopping clutch, and to allow movement of the input device from a stroke-end position to a stroke-begin position;
   a torque limiter to prevent the input device from applying more than a threshold amount of torque; and
   planetary gearing to receive an input torque from the backstopping clutch and to provide an output torque to the overrunning clutch.

13. The manually actuated door assembly of claim 12, wherein the input device is a manually operated lever arm having two positions, comprising:
   a storage position, wherein a fastener retains the lever arm in the storage position; and
   an operable position, oriented to provide mechanical advantage when applying the force;
   wherein the input device is configured to, upon movement from a storage position to an operable position, to trigger movement of the drive component from the disengaged position to the engaged position.

14. The manually actuated door assembly of claim 12, wherein the drive component comprises:
   a drive spline and a driven spline, each spline having teeth defining surfaces on an engagement end to produce, when put into contact, relative rotation of the splines to facilitate engagement of teeth of the drive spline and the driven spline.

* * * * *